No. 638,698. Patented Dec. 12, 1899.
B. A. BOURIE.
PERCOLATOR FOR TEA OR COFFEE POTS.
(Application filed Aug. 5, 1899.)
(No Model.) 2 Sheets—Sheet 1.
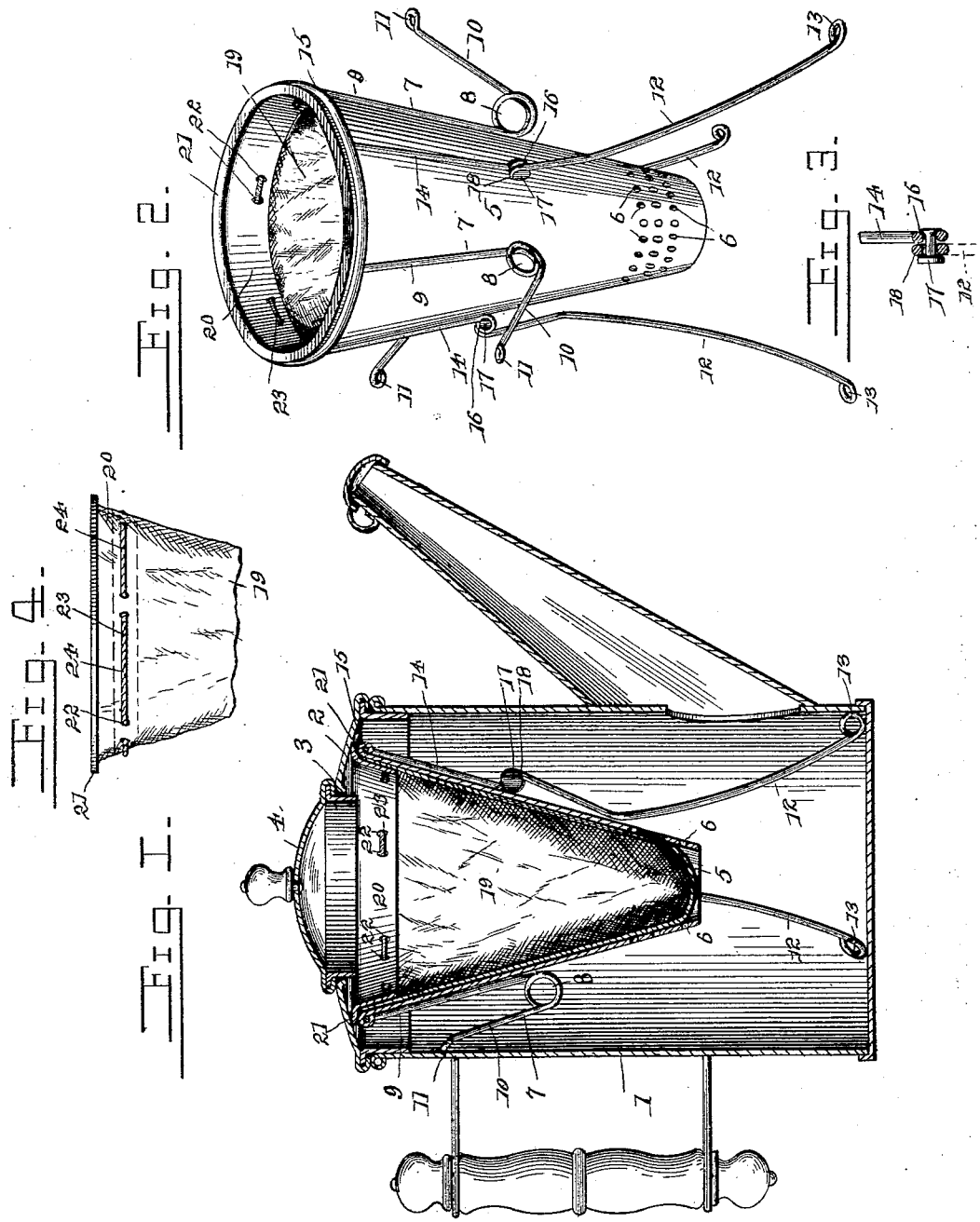
Witnesses
F. E. Alden.
Brutus A. Bourie Inventor.
By his Attorneys, No. 638,698. Patented Dec. 12, 1899.
B. A. BOURIE.
PERCOLATOR FOR TEA OR COFFEE POTS.
(Application filed Aug. 5, 1899.)
(No Model.) 2 Sheets—Sheet 2.
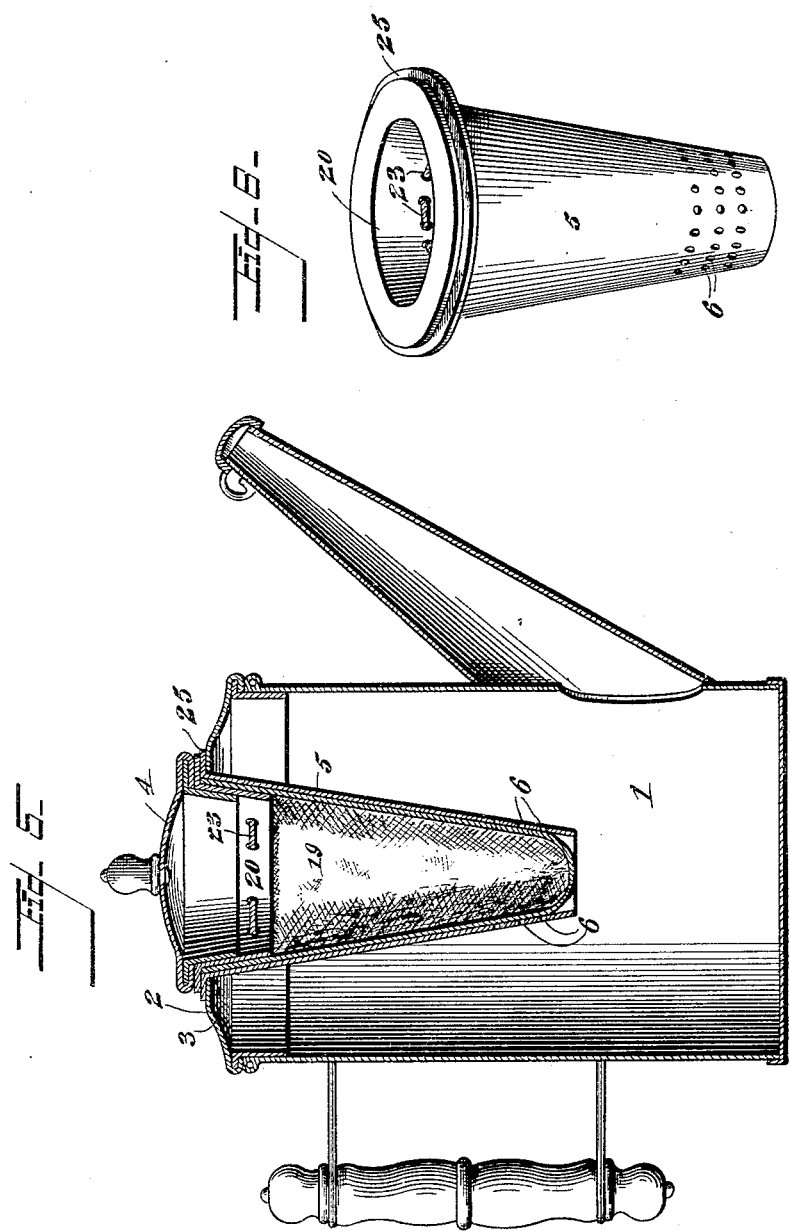
Witnesses
F. D. Ammen
O. P. Shepard
Brutus A. Bourie Inventor
By his Attorneys,
C. A. Snow & Co.

UNITED STATES PATENT OFFICE.

BRUTUS A. BOURIE, OF FORT WAYNE, INDIANA.

PERCOLATOR FOR TEA OR COFFEE POTS.

SPECIFICATION forming part of Letters Patent No. 638,698, dated December 12, 1899.

Application filed August 5, 1899. Serial No. 726,295. (No model.)

*To all whom it may concern:*

Be it known that I, BRUTUS A. BOURIE, a citizen of the United States, residing at Fort Wayne, in the county of Allen and State of Indiana, have invented a new and useful Percolator for Tea or Coffee Pots, of which the following is a specification.

This invention relates to percolators for tea and coffee pots, and has for its object to provide an improved device in which all of the water is brought into contact with the tea or coffee, thereby effecting a perfected steeping of the latter.

A further object is to provide improved means for supporting and spacing the percolator within the body of a pot and also for detachably connecting the percolator-bag to the supporting-ring thereof.

To these ends the present invention consists in the combination and arrangement of parts, as will be hereinafter more fully, described, shown in the accompanying drawings, and particularly pointed out in the appended claims, it being understood that changes in the form, proportion, size, and minor details of construction may be made within the scope of the appended claims without departing from the spirit or sacrificing any of the advantages of the present invention.

In the drawings, Figure 1 is a longitudinal sectional view of a coffee-pot having the improved percolator applied thereto. Fig. 2 is an enlarged detail perspective view of the percolator detached from the pot. Fig. 3 is an enlarged detail sectional view taken through the pivotal or hinged connection of one of the supporting-legs. Fig. 4 is a detail elevation of the strainer-bag and the suspending-ring thereof detached from the pot. Fig. 5 is a longitudinal sectional view of a coffee-pot having the improved percolator applied thereto and supported in a modified manner. Fig. 6 is an enlarged detail perspective view of the percolator in its modified form.

Corresponding parts in the several figures of the drawings are denoted by like characters of reference.

Referring to the accompanying drawings, 1 designates the body of the tea or coffee pot, of common or ordinary form, having a lid 2, which is provided with a central opening 3, and this latter opening is closed by a suitable cover 4. It is preferable to have a comparatively small opening provided through the main lid, so as to permit of the water being poured into the interior of the pot without entirely uncovering the latter, which would result in the escape of steam and the consequent loss of the aroma of the beverage.

The percolator proper comprises an inverted truncated cone 5, which is open at the top and bottom thereof and provided near its lower end with a peripheral series of perforations or small openings 6. The strainer for the percolator comprises a substantially conical-shaped bag 19, formed of suitable cloth, and fits snugly the inner walls of the body of the percolator. This bag is suspened within the body 5 by means of a ring 20, having an outer annular flange 21 provided at its upper edge and adapted to rest upon the upper edge of the body 5, so as to support the ring in position. To detachably connect the bag to the ring, the latter is provided with openings 22, which are arranged in pairs, the latter being spaced equally throughout the length of the ring, and a thread or cord 23 is passed through the upper edge of the bag and the several openings 22, whereby the bag is conveniently connected to the suspending-ring and may be readily detached therefrom. It is preferable to space the pairs of openings 22 at a considerable interval, so that the long stitch or portion 24 of the cord or thread may embrace the exterior of the bag, as best shown in Fig. 4, and hold the latter more evenly against the periphery of the suspending-ring.

One manner of mounting the percolator within the body of the pot is shown in Figs. 1 and 2 and comprises several spacing devices 7, preferably three in number, which are fitted exteriorly to the metal body 5 of the percolator. Each of these devices is formed from a single length of spring-wire, twisted intermediate of its ends into a coiled spring 8, and the opposite arms 9 and 10. It will be noted that each device is of substantially U-shaped formation, the arm 9 being longer than the other arm and soldered or otherwise secured to the exterior of the body 5, and locating the spring-coil 8 about midway of the body. The other arm 10 is a spring-arm and extends upwardly and outwardly, having its outer free end bent into an eye 11, which is deflected outwardly and adapted to frictionally engage the interior walls of the pot, as will be hereinafter more fully described.

Intermediate of the adjacent spacing devices there is provided a hinged leg or standard 12, having its lower end bent into an eye 13, located in the vertical plane of the leg and forming a foot therefor. The upper end of the leg is pivoted or hinged to the body of the percolator, so as to be capable of an outward movement in a radial plane by means of an arm 14, comprising a single length of wire soldered or otherwise secured to the exterior of the percolator and extending longitudinally thereof. At its upper end this arm 14 abuts against the under side of the head 15 at the upper end of the body, as do also the attaching-arms 9 of the spacing devices, and at its lower end, which preferably terminates above the spring 8 of the spacing devices, is twisted into an eye 16, which is disposed at substantially right angles to the body of the percolator and carries a fixed headed pivot-pin 17. The upper end of the leg 12 is twisted into an eye 18, which loosely embraces the projecting portion of the pivot-pin, intermediate of the head thereof, and the eye of the arm 14, as best shown in Fig. 3 of the drawings, thereby pivoting or hinging the leg to the percolator.

A modified form of the percolator is shown in Figs. 5 and 6 and is designed to be supported by the lid of the pot, thereby dispensing with the supporting-legs and the spring spacing devices. In this form of the device the only mechanical change in the body 5 of the percolator consists in providing an outer annular flange 25 at the upper end of the body and having the latter of the same diameter as the opening 3 in the lid 2, so that the annular flange 25 may rest upon the upper side of the lid, and thereby suspend the percolator within the body of the pot. By this arrangement the cover 4, instead of being fitted to the lid 2, is fitted within the upper open end of the percolator 5. It will be understood that the strainer-bag 19 and the suspending-ring 20 are used with this latter form of the device without altering or changing the same in any respect, the bag fitting snugly the interior walls of the body of the percolator, precisely as described for the first form of the invention. Also, the body of the percolator is somewhat smaller in diameter than the central opening in the lid 2, so that the percolator may be readily inserted and removed through said opening without necessitating the removal of the lid.

In the operation of the device the lid 2 is first removed, so that the percolator may be readily introduced into the interior of the pot, the feet 13 of the legs 12 resting upon the bottom of the pot and against opposite sides thereof and the free extremities of the spring-arms 10 engaging opposite sides of the pot, so as to space the percolator centrally thereof. The coffee or tea is then placed in the strainer-bag 19, after which the lid 2 is placed upon the top of the pot. Boiling water is then poured through the central opening 3 in the main lid, and then the smaller cover 4 is fitted in place to close the central opening 3. It will be noted that the strainer-bag 19 fits snugly the interior walls of the conical body 5 and also extends to the lower open end thereof, whereby all of the boiling water is confined within the bag, and thereby forced to pass through the tea or coffee contained within the bag and may escape only through the bottom of the latter and laterally through the openings or perforations 6 in the lower walls of the body. If the strainer-bag did not fit snugly the interior walls of the conical body, some of the water would pass through the upper portion of the bag and escape between the sides of the latter and the body, thereby avoiding contact with the tea or coffee in the bag, which would result in an imperfect steeping of the tea or coffee. The present arrangement of the strainer-bag, fitting snugly throughout the entire length of the imperforate bag-supporting walls of the percolator-body, obviates this difficulty, and a thorough and perfected intermingling of the water with the tea or coffee is effected. Furthermore, it is a well-known fact that better results are obtained through the use of a textile or like strainer than by a metallic strainer, and by combining the two, as hereinbefore described, the advantages of each are preserved and the disadvantages are obviated—i. e., the rigid or imperforate body fitting snugly the textile strainer-bag compels the water to pass through the material contained within the strainer, and said bag holds the material out of contact with the metallic body.

It will be noted that in both forms of the percolator the lid 2 fits snugly the upper end of the body of the percolator, so that the upper end of the pot is effectively closed against evaporation or escapement of the aroma or strength of the coffee and permits of the cover 4 being removed without injury to the contents of the pot.

Having thus described my invention, what I claim as new, and desire to secure by Letters Patent, is—

1. A percolator, comprising a substantially rigid body, open at opposite ends, and having imperforate bag-supporting walls, and a strainer-bag open at its upper end only, suspended within the body, fitting snugly the imperforate bag-supporting walls thereof, and having its interior surface entirely exposed or uncovered, substantially as and for the purpose set forth.

2. A percolator, comprising a body, fixed eyes provided upon the exterior thereof, pivot-pins carried by the respective eyes and supporting-legs formed of wire and provided with eyes loosely embracing the respective pivot-pins, substantially as shown and described.

3. A percolator, comprising a body, a plurality of arms soldered or otherwise secured longitudinally to the exterior of the body, each arm being formed from a single length of wire, having its lower end bent into an eye located at substantially right angles to the body, headed pivot-pins fixedly carried by the eyes of the respective arms, and supporting-legs, each of the latter being formed from a single length of wire having an eye formed at its lower end and providing a foot, and another eye formed at the upper end of the leg and loosely embracing one of the pivot-pins, substantially as shown and described.

In testimony that I claim the foregoing as my own I have hereto affixed my signature in the presence of two witnesses.

BRUTUS A. BOURIE.

Witnesses:
JAMES E. GRAHAM,
LUNA O. GRAHAM.